(No Model.) 2 Sheets—Sheet 1.
W. WEBBER.
BICYCLE TRAINING DEVICE.
No. 554,754. Patented Feb. 18, 1896.
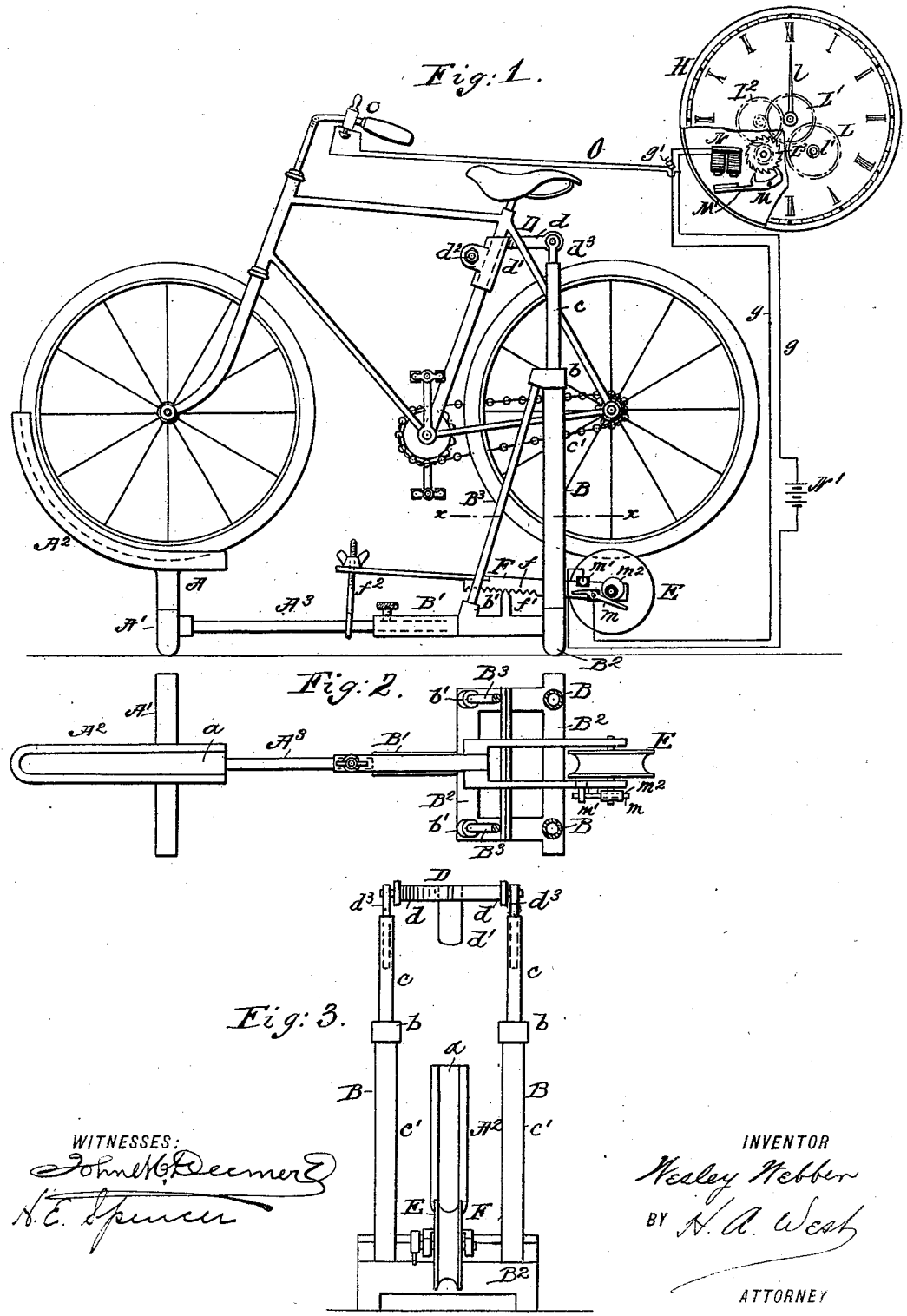

(No Model.) 2 Sheets—Sheet 2.

W. WEBBER.
BICYCLE TRAINING DEVICE.

No. 554,754. Patented Feb. 18, 1896.

WITNESSES: INVENTOR
Wesley Webber
BY N. A. West
ATTORNEY

UNITED STATES PATENT OFFICE.

WESLEY WEBBER, OF PITTSBURG, PENNSYLVANIA.

BICYCLE TRAINING DEVICE.

SPECIFICATION forming part of Letters Patent No. 554,754, dated February 18, 1896.

Application filed April 6, 1895. Serial No. 544,828. (No model.)

*To all whom it may concern:*

Be it known that I, WESLEY WEBBER, a citizen of the United States, and a resident of Pittsburg, in the county of Allegheny and State of Pennsylvania, have invented certain new and useful Improvements in Bicycle Training Apparatus, of which the following is a specification.

My invention consists of an apparatus designed to support and sustain a bicycle when not in use, and to adapt a bicycle to be used indoors as an exercising and training machine, affording the same muscular action as outdoor riding.

Figure 4:
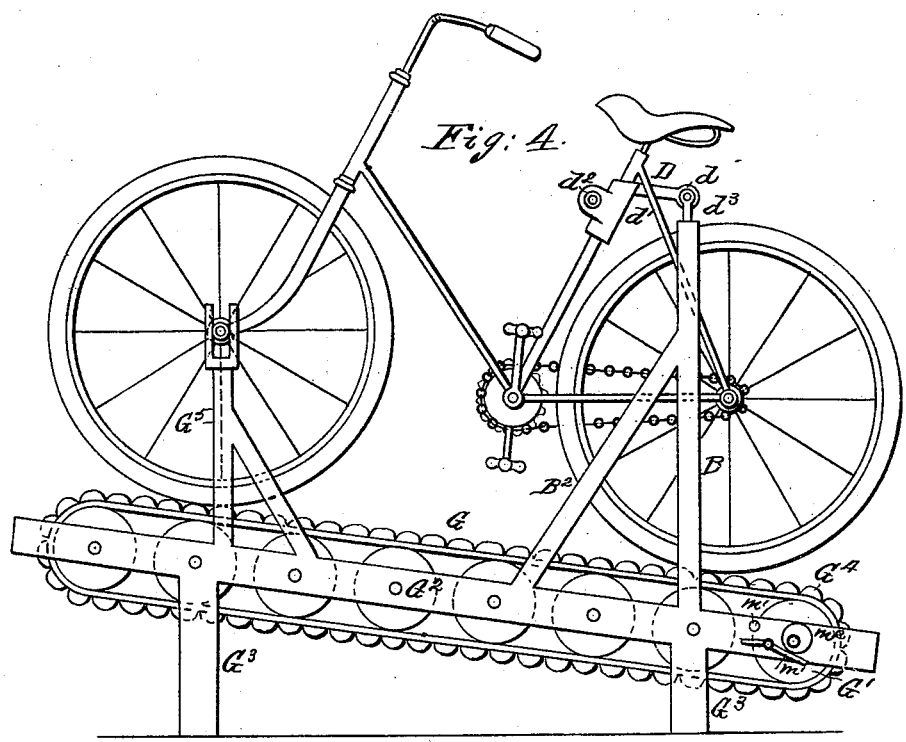
Figure 5:
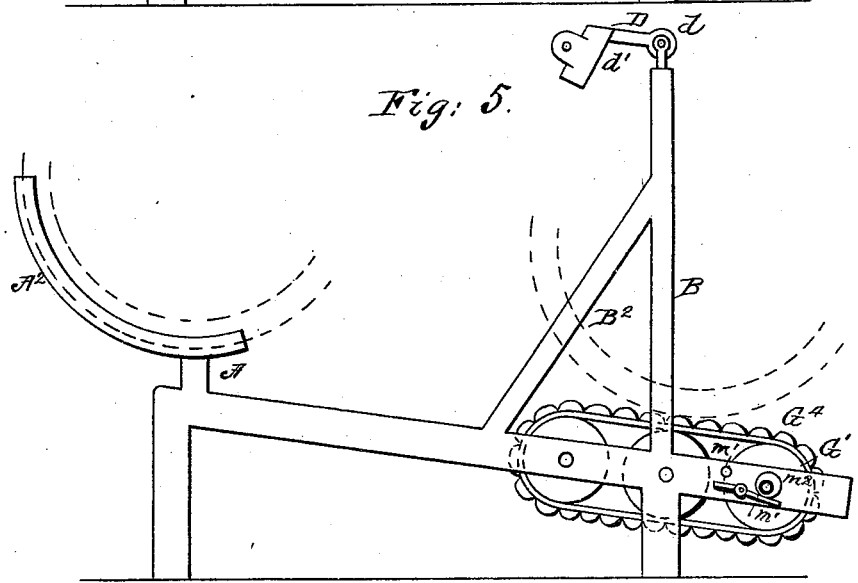
Figure 6:
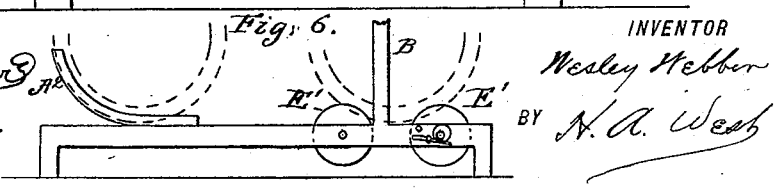

In the accompanying drawings, to which reference is made, Figure 1 is a side elevation of my new bicycle-support, showing a bicycle mounted thereon, and showing also an electric attachment for indicating the speed of action. Fig. 2 is a sectional plan view of the support, the section being taken on line $x\ x$ of Fig. 1. Fig. 3 is a rear elevation of the support. Figs. 4 and 5 are side elevations showing two modifications of the support, and Fig. 6 is a detailed view showing another modification for the support or tread of the rear bicycle-wheel.

A represents the front, and B B the rear, uprights or standards of my new bicycle-support. The front standard, A, rises from a foot or base piece A', and is formed or provided with a rest or socket $A^2$ for the front wheel of a bicycle. This socket is by preference curved and recessed in its upper edge, as shown at $a$, to conform to and receive the bicycle-tire, as shown clearly in Fig. 1, to prevent all danger of displacement and to obviate injurious spreading of the tire. The said foot or base A' is also formed or provided with a central horizontal reach $A^3$, which is adjustably connected, preferably by telescoping, with another reach B', attached to or formed with the rear foot or base, $B^2$, to the rear corners of which the rear standards, B B, are attached, which standards are braced by rods $B^3 B^3$, which reach from screw-socketed union pieces or collars $b$ down to screw-tapped bosses $b'\ b'$, formed at the front corners of the said rear foot or base, $B^2$, as shown clearly in Figs. 1 and 2.

The rear standards, B B, are by preference each formed of two sections of tube $c\ c'$, united by the union pieces or collars $b$. The upper smaller sections, $c$, receive or have attached to them a yoke D to engage with the bicycle for holding it firmly in position between the standards. Said yoke D may be made adjustable to adapt it to bicycles of different sizes. As here shown it is formed with arms $d\ d$ and clamp $d'$, operated by a screw $d^2$, to engage it with the bicycle-frame. The arms $d$ are provided with bolts $d^3$, which enter the uprights and cause the yoke to sustain the bicycle in position and support more or less the weight thereof. The bolts $d^3$ are by preference pivoted to the arms $d$, so that the angle of the clamp may be changed to correspond with the slant of the tubes of the bicycle-frame.

The rear wheel of the bicycle is supported wholly or partially upon a support, which serves as a resistance to the operation of the bicycle. In the construction shown in Figs. 1 and 2 the said support is in the form of a wheel E, journaled in an adjustable rod or arm F, which is also adjustable longitudinally for centering or aligning the support with the axis of the bicycle-wheel. The rod or arm F is notched at its lower edge, as shown at $f$, to rest firmly upon a bar or stud $f'$ and is provided with a yoke $f^2$, which slides loosely upon the reach $A^3$, and is provided with a screw above the arm F, so that the latter may be depressed for increasing or diminishing the resistance of the support to the bicycle-wheel.

In Fig. 4 the bicycle-wheels turn upon a support similar to a treadmill, the endless belt G of which runs upon a series of rollers $G'$, journaled in a main frame $G^2$, supported on legs $G^3$. The endless belt may be provided with lags $G^4$ to prevent slipping of the bicycle-wheels and to impart an up-and-down or jarring motion to the bicycle and rider. The main frame $G^2$ may be inclined to afford suitable resistance to the operation of the bicycle. The bicycle-frame is held as in Figs. 1, 2 and 3. The front wheel of the bicycle is supported in and between two arms $G^5$, which are forked at their upper ends to embrace the ends of the shaft at the ends of the fork.

In Fig. 5 the rear wheel only of the bicycle is supported upon a short endless belt G, arranged upon rollers G', journaled in the main frame, which belt and rollers turn with the bicycle-wheel and offer resistance thereto. The front wheel is supported as in Figs. 1, 2 and 3.

In Fig. 6 the rear wheel of the bicycle is supported upon a pair of wheels E' E', journaled a short distance apart in the main frame. These wheels being a short distance apart afford suitable resistance to the operation of the bicycle. The front bicycle-wheel is supported as in Figs. 1, 2 and 3.

H, Fig. 1, represents a register designed to indicate the number of revolutions of the bicycle-wheel and from which the speed of operation can be calculated, the circumference of the rear bicycle-wheel or that of wheels E or G' being known. The register is designed to be attached to the wall or other support, so that the progress of its pointer $l$ will be in full view of the rider. The pointer is operated primarily by a train of clock-gearing L L' $L^2$ and escapement-wheel $L^3$. A main spring is attached to the wheel L and winding-post $l$, to which a key may be applied for winding up the spring.

The escapement-pallet M is attached to an arm M', which forms an armature to the magnets N. These magnets are connected in circuit with the battery N' and circuit breaker or switch $m$, which forms one terminal of the circuit. $m'$ is the other terminal. The switch is operated to open and close the circuit once for every revolution of the wheel E or G' by a toe or cam $m^2$, secured to the said wheel or its shaft. With each closing of the circuit the magnets N are energized, causing the escapement-pallet to be operated by the lifting of the armature M'. When the circuit is broken the armature drops away from the magnets. With each operation of the armature and pallet the escapement-wheel is released one tooth, thus permitting the main spring and clock-gearing to turn the pointer on the dial, thus registering each rotation of the wheel E or G'.

O represents a shunt leading from one of the wires $g$ of the main circuit and a switch $g'$ in the other main wire to a button or switch $o$. This button may be attached to the bicycle or held in the hand of the rider, so that he may turn on or cut off the circuit from the register H at will, enabling the rider to time his speed during full headway.

Having thus described my invention, what I claim as new, and desire to secure by Letters Patent, is—

1. In a bicycle-support a front standard provided with a curved semitubular rest for the front wheel of the bicycle, a pair of rear standards, an adjustable support between the said rear standards for the rear wheel of the bicycle, a vertically-adjustable section connected to each of said rear standards, a yoke pivoted to and uniting said vertically-adjustable sections, and a clamp for uniting said yoke to the frame of the bicycle, substantially as described.

2. In a bicycle-support the combination with a pair of rear standards and a base therefor, of a movable support between said standards for the rear wheel of the bicycle, a yoke pivoted to, and uniting, said standards, and a clamp for uniting said yoke to the frame of a bicycle, substantially as described.

3. In a bicycle-support the combination with a pair of rear standards and a yoke pivoted to, and uniting said standards, of a diagonally-arranged clamp forming a central part of said yoke, and adapted to engage with the bicycle-frame, substantially as shown and described.

4. In a bicycle-support, the combination with a pair of rear standards, a movable support for the rear wheel of the bicycle arranged between said standards and rotated by the bicycle-wheel, a pivoted yoke uniting said standards, and an electric circuit-breaker connected to said movable support, substantially as described.

Signed at New York, in the county of New York and State of New York this 30th day of March, A. D. 1895.

WESLEY WEBBER.

Witnesses:
H. A. WEST,
EMILE RIESER.